United States Patent
Jain et al.

(10) Patent No.: US 12,260,163 B2
(45) Date of Patent: Mar. 25, 2025

(54) SYSTEM AND METHOD EMPLOYING POWER-OPTIMIZED TIMING CLOSURE

(71) Applicant: GlobalFoundries U.S. Inc., Malta, NY (US)

(72) Inventors: Navneet Jain, Milpitas, CA (US); Mahbub Rashed, Cupertino, CA (US)

(73) Assignee: GlobalFoundries U.S. Inc., Malta, NY (US)

( * ) Notice: Subject to any disclaimer, the term of this patent is extended or adjusted under 35 U.S.C. 154(b) by 540 days.

(21) Appl. No.: 17/679,178

(22) Filed: Feb. 24, 2022

(65) Prior Publication Data

US 2023/0267259 A1 Aug. 24, 2023

(51) Int. Cl.
G06F 30/39 (2020.01)
*G06F 30/392* (2020.01)
*G06F 30/398* (2020.01)
G06F 111/04 (2020.01)
G06F 111/20 (2020.01)

(52) U.S. Cl.
CPC .......... *G06F 30/392* (2020.01); *G06F 30/398* (2020.01); *G06F 2111/04* (2020.01); *G06F 2111/20* (2020.01)

(58) Field of Classification Search
CPC .. G06F 30/392; G06F 30/398; G06F 2111/04; G06F 2111/20; G06F 2119/12; G06F 30/39
See application file for complete search history.

(56) References Cited

U.S. PATENT DOCUMENTS

| | | | |
|---|---|---|---|
| 5,508,937 A | 4/1996 | Abato et al. | |
| 5,619,420 A * | 4/1997 | Breid | H01L 27/0207 716/113 |
| 5,896,299 A | 4/1999 | Ginetti et al. | |
| 7,278,126 B2 * | 10/2007 | Sun | G06F 30/3312 716/134 |
| 8,286,109 B1 | 10/2012 | So et al. | |

(Continued)

OTHER PUBLICATIONS

Miyaguchi et al., "Single and Double Diffusion Breaks in 14nm FinFET and Beyond," Extended Abstracts of the 2017 International conference on Solid State Devices and Materials, 2017, pp. 219-220.

*Primary Examiner* — Nghia M Doan
(74) *Attorney, Agent, or Firm* — David Cain; Hoffman Warnick LLC

(57) ABSTRACT

Disclosed are embodiments of a computer-aided design system and corresponding method for power-optimized timing closure of an integrated circuit (IC) design. In the embodiments, a cell library includes sets of cells, where each cell in the same set has the same internal structure but different combinations of cell boundary isolation structures associated with different passive delay values. Timing closure includes replacement of a cell in a previously generated layout with another cell from the same set in order to adjust delay (e.g., increase delay) of a data signal or clock signal and, thereby facilitate fixing of a previously identified violation of a timing constraint. By eliminating or at least minimizing the need to insert buffer and/or inverter cells into a layout to add delay to a data signal and/or a clock signal during timing closure, the embodiments avoid or at least limit concurrent increases in power consumption and area consumption.

20 Claims, 11 Drawing Sheets

(56) References Cited

U.S. PATENT DOCUMENTS

| | | |
|---|---|---|
| 9,083,325 B2 | 7/2015 | Datta et al. |
| 9,171,112 B2 | 10/2015 | Kalpat et al. |
| 9,811,624 B2 | 11/2017 | van Ginneken et al. |
| 10,360,334 B2 | 7/2019 | Jain et al. |
| 2004/0216066 A1 | 10/2004 | Chaudhari |
| 2015/0269304 A1* | 9/2015 | Zahn .................... G06F 30/398 716/113 |
| 2017/0141109 A1* | 5/2017 | Jain .................... H01L 27/0886 |
| 2021/0165946 A1* | 6/2021 | Chae .................... G06F 30/392 |

* cited by examiner

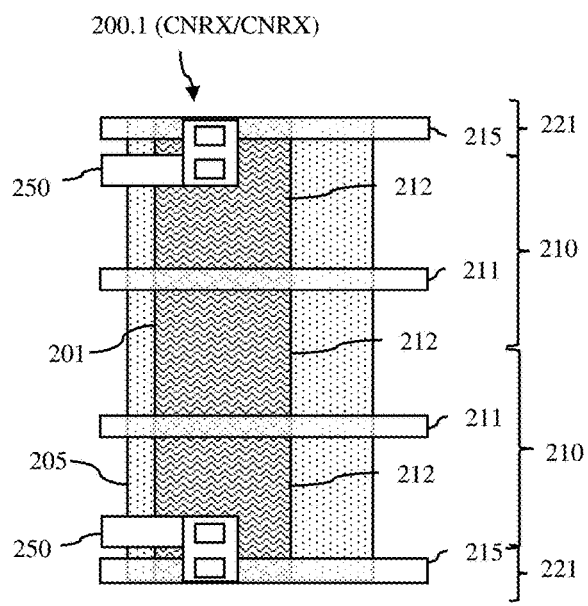
FIG. 2.1
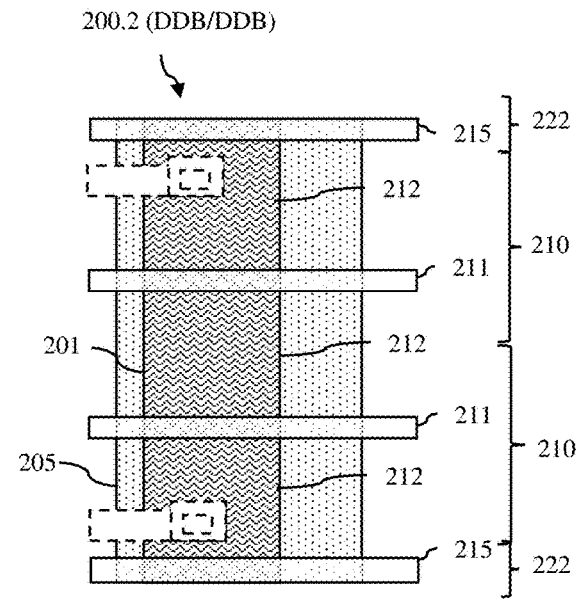
FIG. 2.2
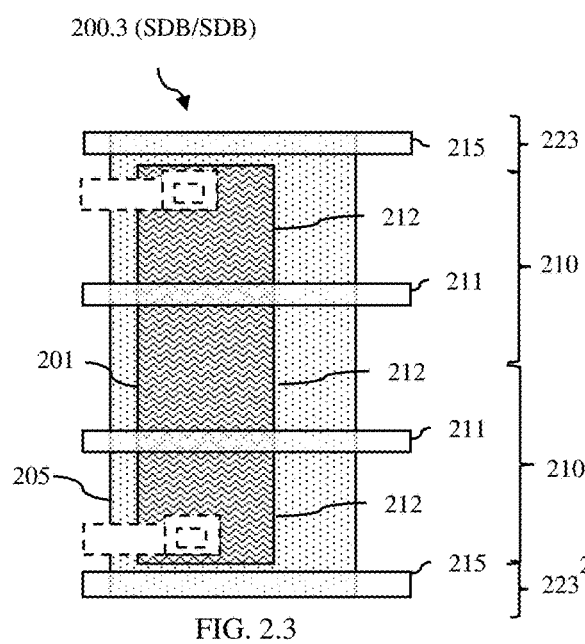
FIG. 2.3
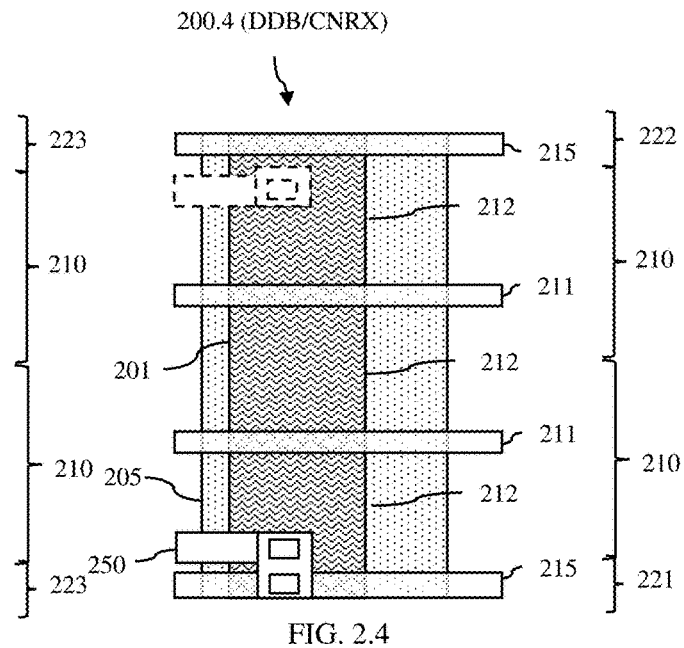
FIG. 2.4

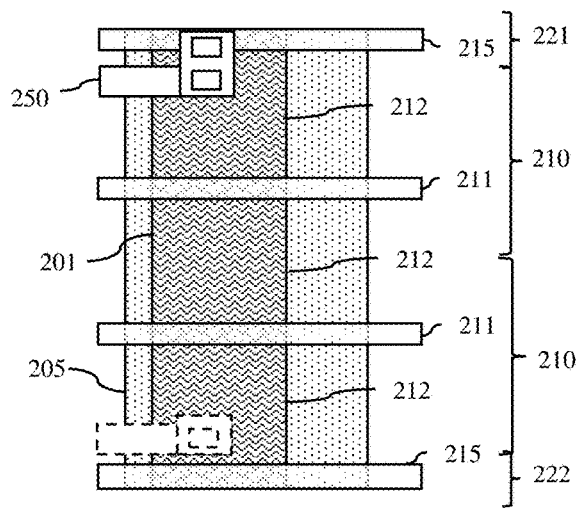
FIG. 2.5
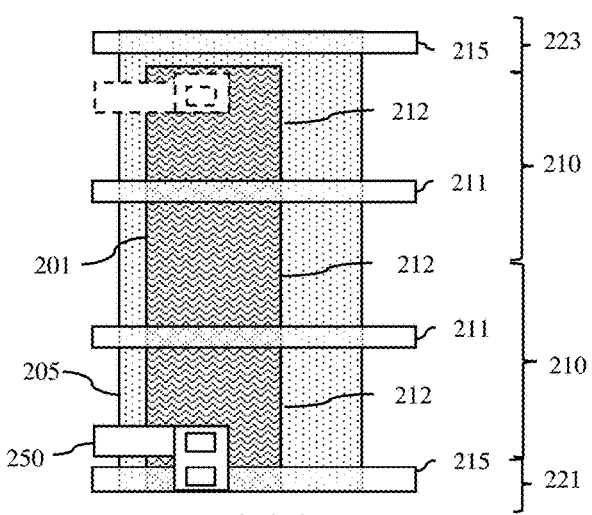
FIG. 2.6
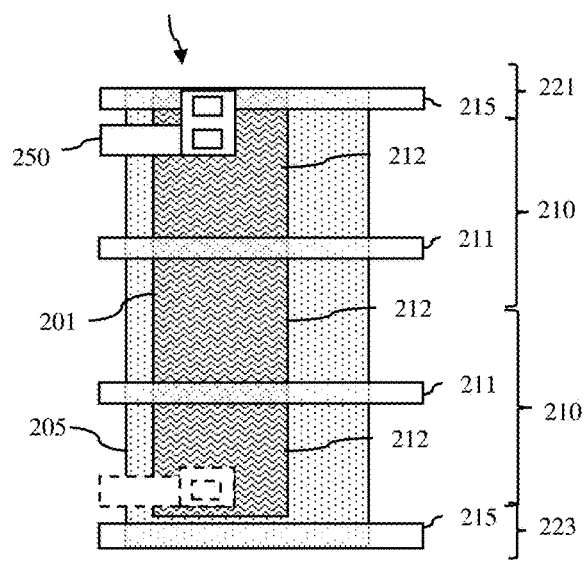
FIG. 2.7
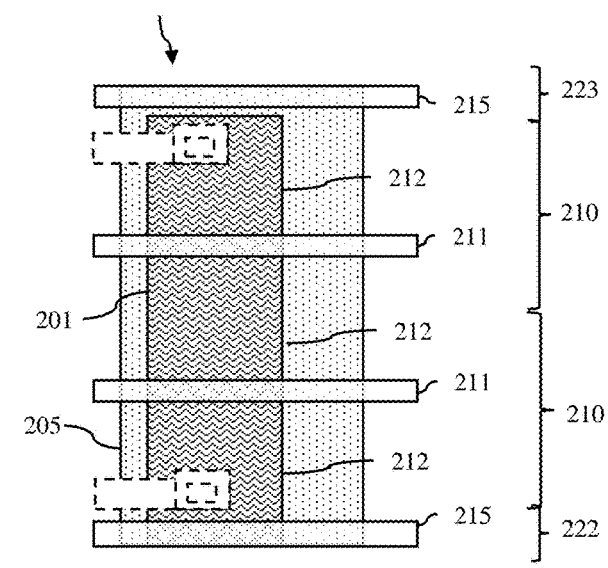
FIG. 2.8

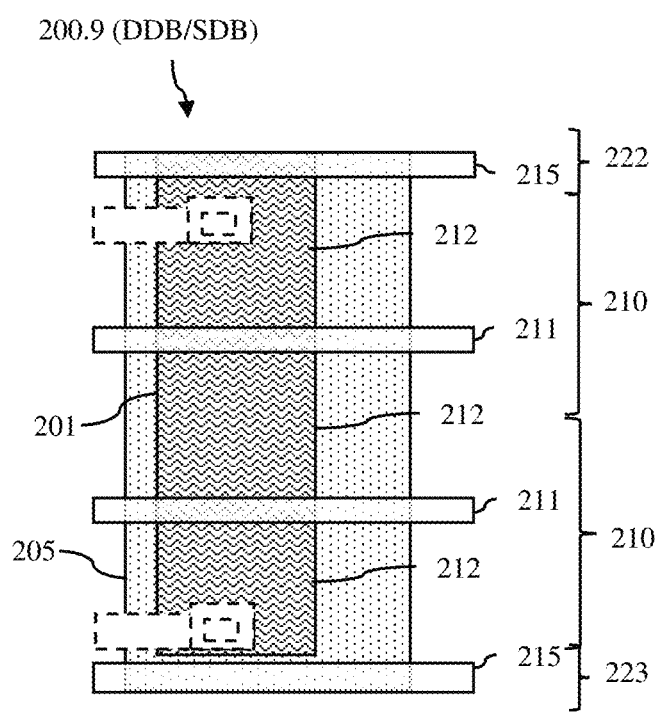
FIG. 2.9

LAYOUT

SYSTEM AND METHOD EMPLOYING POWER-OPTIMIZED TIMING CLOSURE

BACKGROUND

Field of the Invention

The present invention relates to logic circuits and, more particularly, to embodiments of a system and method for performing timing closure of a logic circuit structure and embodiments of a logic circuit structure.

Description of Related Art

Timing-driven placement is a process performed during integrated circuit (IC) design. Specifically, during timing-driven placement, cells (e.g., standard cells and, optionally, parameterized cells) that have been selected from a cell library for incorporation into a design of an IC are placed in (i.e., assigned a location in) a layout in such a way that minimizes signal delays. Additional design priorities, such as power consumption, area consumption, manufacturing efficiency and complexity, costs, etc., can also be considered during cell placement in a layout. Static timing analysis (STA) is a process performed during IC design to predict the timing performance of the layout. The results of the STA are compared to previously established timing constraints in order to identify timing constraint violations. Timing closure is a process performed during IC design to fix any identified timing constraint violations (e.g., by modifying the design) and to thereby ensure that an IC manufactured according to a final IC design will, to some sufficiently high degree of probability, function properly. Various different techniques are known for fixing different types of timing constraint violations during timing closure; however, often times with such techniques there is a trade-off with other design priorities.

SUMMARY

In view of the foregoing, disclosed herein are embodiments of a computer-aided design system and corresponding method for power-optimized timing closure of an integrated circuit (IC) design. In the embodiments, a cell library can include sets of cells, where each cell in the same set has the same internal structure but different combinations of cell boundary isolation structures associated with different passive delay values, respectively. Timing closure can include replacement of one or more cell(s) in a previously generated layout with one or more other cell(s), where each replacement cell is from the same set as the original cell in the cell library and is used to adjust delay (e.g., increase delay) of a data signal or clock signal and, thereby to facilitate fixing of a previously identified violation of a timing constraint. By eliminating or at least minimizing the need to insert buffer and/or inverter cells into a layout to add delay to a data signal and/or a clock signal during timing closure, the disclosed embodiments avoid or at least limit concurrent increases in power consumption and area consumption.

More particularly, disclosed herein are embodiments of a computer-aided design system. The system can include a memory. The memory can store a cell library and the cell library can include sets of cells, where all cells in a given set of cells have different combinations of cell boundary isolation structures associated with different delay values, respectively. The memory can also store a previously generated layout for a design of a logic circuit. This layout can include multiple cells, which were selected from the cell library and which together represent the logic circuit under design. The memory can further store previously established timing constraints for the logic circuit. The system can further include a processor, which is in communication with the memory. The processor can perform timing closure, generating an updated layout in which previously identified timing constraint violation(s) is/are fixed. In the disclosed embodiments, generation of the updated layout can specifically include replacing a cell of the multiple cells in the layout with another cell from the same set of cells in the cell library in order to facilitate fixing of a violation of a timing constraint (i.e., in order to fix or assisting in fixing a violation). For example, replacement of one cell with another cell from the same set can be employed to add delay to a data signal or a clock signal, while avoiding a concurrent increase in power consumption and at least limiting a concurrent increase in area consumption.

Also disclosed herein are embodiments of a design system. The design method can include accessing, by a processor from memory, a cell library, a previously generated layout for a design of a logic circuit, and timing constraints for the logic circuit. The cell library can include sets of cells, where all cells in a given set of cells have different combinations of cell boundary isolation structures associated with different delay values, respectively. The layout can include multiple cells, which were selected from the cell library and which together represent the logic circuit under design. The method can further include performing, by the processor, timing closure including generating an updated layout in which previously identified timing constraint violation(s) is/are fixed. Generation of the updated layout can specifically include replacing a cell of the multiple cells in the layout with another cell from the same set of cells in the cell library in order to facilitate fixing of a violation of a timing constraint (i.e., in order to fix or assisting in fixing a violation). For example, replacement of one cell with another cell from the same set can be employed to add delay to a data signal or a clock signal, while avoiding a concurrent increase in power consumption and at least limiting a concurrent increase in area consumption.

Also disclosed herein are embodiments of a computer program product. This computer program product can include a non-transitory computer readable storage medium having program instructions embodied therewith (e.g., one or more electronic design automation (EDA) tools stored thereon). The program instructions can be executable by a processor to cause the processor to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 2.1-2.9 are diagrams illustrating layouts, respectively, for nine exemplary cells with similar internal configurations but different cell boundary isolation structure configurations;

DETAILED DESCRIPTION

Figure 1:
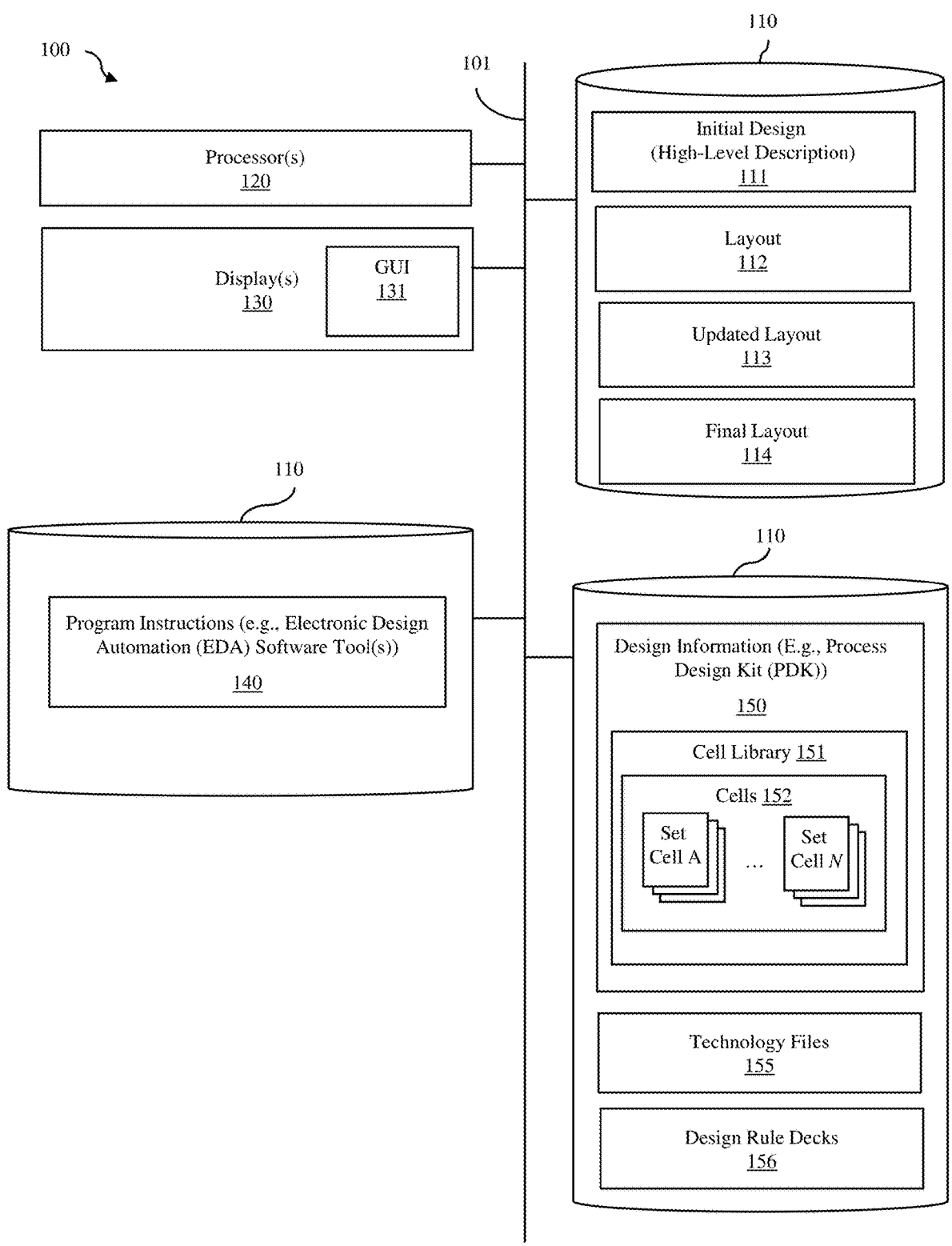
FIG. 1 is a schematic diagram illustrating embodiments of a computer-aided integrated circuit (IC) design system configured to include the performance of power-optimized timing closure.

Timing-driven placement is a process performed during integrated circuit (IC) design. Specifically, during timing-driven placement, cells (e.g., standard cells and, optionally, parameterized cells) that have been selected from a cell library for incorporation into a design of an IC are placed in (i.e., assigned a location in) a layout in such a way that minimizes signal delays. Additional design priorities, such as power consumption, area consumption, manufacturing efficiency and complexity, costs, etc., can also be considered during cell placement in a layout. Static timing analysis (STA) is a process performed during IC design to predict the timing performance of the layout. The results of the STA are compared to previously established timing constraints in order to identify any timing constraint violations. Timing closure is a process performed during IC design to fix identified timing constraint violations (e.g., by modifying the design) and to thereby ensure that an IC manufactured according to a final IC design will, to some sufficiently high degree of probability, function properly. Various different techniques are known for fixing different types of timing constraint violations during timing closure; however, often times with such techniques there is a trade-off with other design priorities.

For example, consider a design flow for a logic circuit with a flop-to-flop data path controlled by a clock signal. Initial cell placement can be timing-driven to minimize both data signal and clock signal delay as well as driven by power consumption, area consumption, manufacturing efficiency and complexity, costs, etc. Timing constraints for such a logic circuit can include setup and hold times for the flip-flops in the flop-to-flop data path. Those skilled in the art will recognizes that setup time refers to the minimum amount of time required before the clock signal's active edge that data must be stable for it to be correctly latched and hold time refers to the minimum amount of time after the clock signal's active edge that data must be stable for it to be correctly latched. If STA reveals a hold time violation, the timing closure that is performed to fix that hold time violation will typically involve inserting buffer and/or inverter cells into the flop-to-flop data path to add delay to the data signal. However, the buffer and/or inverter cells can cause a corresponding increase in power consumption (e.g., due to increases in leakage current and dynamic power) as well as an increase in area consumption (i.e., in the size of the design footprint).

In view of the foregoing, disclosed herein are embodiments of a computer-aided design system and corresponding method for power-optimized timing closure. In the embodiments, a cell library can include sets of cells, where each cell in the same set has the same internal structure but different combinations of cell boundary isolation structures associated with different passive delay values, respectively. Cell placement can be performed during layout generation and a timing analysis can be performed on the layout in order to identify any timing constraint violations. When timing constraint violation(s) is/are identified, timing closure can be performed, generating an updated layout in which previously identified timing constraint violation(s) is/are fixed. Timing closure can specifically include replacement of one or more cells in the layout with one or more replacement cells, where each replacement cell is from the same set as the original cell and where such replacement is performed in order to adjust delay (e.g., increase delay) of a data signal or clock signal and thereby to facilitate fixing (i.e., to fix or assist in fixing) one or more previously identified timing constraint violations. By eliminating or at least minimizing the need to insert buffer and/or inverter cells into a layout to add delay to a data signal and/or a clock signal during timing closure, the disclosed embodiments avoid or at least limit concurrent increases in power consumption and area consumption.

More particularly, referring to FIG. 1, disclosed herein are embodiments of a computer-aided integrated circuit (IC) design system 100 configured to enable the performance of power-optimized timing closure (e.g., power optimized hold time closure of a flip-to-flop data path in a logic circuit).

One exemplary embodiment of the system 100 can include one or more processors 120, one or more displays 130, and one or more memories 110 (e.g., one or more non-transitory computer readable storage mediums or devices). The various components of the system 100 including, but not limited to, the processor(s) 120, display(s) 130, and memories 110 can be interconnected over a network 101 including, for example, a system bus and, optionally, a wired or wireless network.

The memory 110 can store sets of program instructions 140, which are readable by a processor 120 and can be executed by a processor 120 during different stages in a design flow. The sets of program instructions 140 can be in the form of design automation (EDA) tools (e.g., specialized software program(s)). Exemplary EDA tools can include, but are not limited to a schematics generation tool, a floorplanning tool, a power planning tool, an input/output pin placement tool, a cell placement tool, a clock planning tool, a wire routing tool, a timing analysis tool, a timing closure tool, a design verification tools (e.g., a layout versus schematic (LVS) checking tool, etc.), design rule checking (DRC) tool(s), simulator(s), etc. Such tools are well known in the art. Therefore, in order to allow the reader to focus on the salient aspects of the disclosed embodiments, these tools are described only generally, except for the novel features thereof disclosed herein (e.g., except for the novel features associated with cell selection, cell placement and timing closure using the sets of cells 152 contained in a cell library 151, as discussed in greater detail below).

The memory 110 can further store design information 150, which is accessible by a processor 120 and usable during different stages in the design flow. The design information 150 can be in the form, for example, of a process design kit (PDK). The design information 150 can include, but is not limited to, technology files 155 for a specific technology node, rule decks 156, and a cell library 151.

Those skilled in the art will recognize that technology files refer to files that define the layers and devices that are available for a particular fabrication process as well as the generic physical and electrical rules for the specific technology node. Furthermore, design rule decks refer to discrete sets of design rules (also called run sets), where each rule deck includes design rules that are applicable to one or more of the particular processes in the design flow. A cell library 151 is a database that defines multiple different cells 152 and the symbols thereof that can be incorporated into a schematic diagram of an IC under design in the specific technology node. Each cell 152 can represent an IC component. The IC component can be a single device (e.g., a transistor, capacitor, resistor, etc.) or other feature (e.g., an isolation region, etc.) or multiple interconnected devices (e.g., a logic gate) or features. Each cell 152 can further be associated with additional design information optionally including, but not limited to, timing, power and noise information. The cells 152 in the cell library 151 can include standard cells and, optionally, parameterized cells (Pcells) and/or custom cells. Such cells are well known in the art and, thus, the details thereof have been omitted from this specification in order to allow the reader to focus on the salient aspects of the disclosed embodiments.

In any case, in addition to an IC component, the cells can further have cell boundary isolation structures for providing isolation from adjacent cells placed in a layout, as discussed in greater detail below. These cell boundary isolation structures can be any of three different structures. A first cell boundary isolation structure (also referred to herein as a continuous active semiconductor (CNRX)-type structure) includes a gate at one end of the cell overlaying an edge portion of the active semiconductor region and further electrically coupled to the immediately adjacent inner portion of the active semiconductor region having a different type conductivity than the edge portion. Depending upon the voltage level at the immediately adjacent inner portion of the active semiconductor region and on the gate coupled thereto, current can be prevented from flowing to an adjacent cell. A second cell boundary isolation structure (also referred to herein as a double diffusion break (DDB)-type structure) includes a gate at one end of the cell overlaying an edge portion of the active semiconductor region, like the CNRX-type structure except that the gate and the immediately adjacent inner portion of the active semiconductor region are not electrically coupled. A third cell boundary isolation structure (also referred to herein as a single diffusion break (SDB)-type structure) can include a gate overlaying an isolation region. That is, in an SDB-type structure, the edge portion of the active semiconductor region does not extend under the gate at the end of the cell. The gates in such cell boundary isolation structures are also referred to herein as "dummy" or "non-functional" gates. Such dummy or non-functional gates at opposite ends of a cell can be concurrently formed with and parallel to field effect transistor (FET) gates such that they have essentially the same structure as the FET gates without being a terminal of a functional FET within the cell.

It should be noted that, when such cell boundary isolation structures are employed in p-type field effect transistor (PFET) devices areas, they all inherently provide some degree of passive signal delay due to the associated strain and its impact on charge carrier (i.e., hole) mobility in PFETs. The CRNX-type structure provides the least amount of passive signal delay, whereas the SDB-type structure provides the most amount of passive signal delay. That is, SDB-type structure causes higher signal delay than the DDB-type structure and the DDB-type structure causes higher signal delay than the CRNX-type structure. See also FIGS. 6A and 6B, discussed in greater detail below, showing the impact of changes in overall PFET source/drain area (e.g., as a function of changing cell boundary isolation type) and the corresponding changes in PFET threshold voltage (VT) and saturation drain current (IDsat).

Figure 6A:
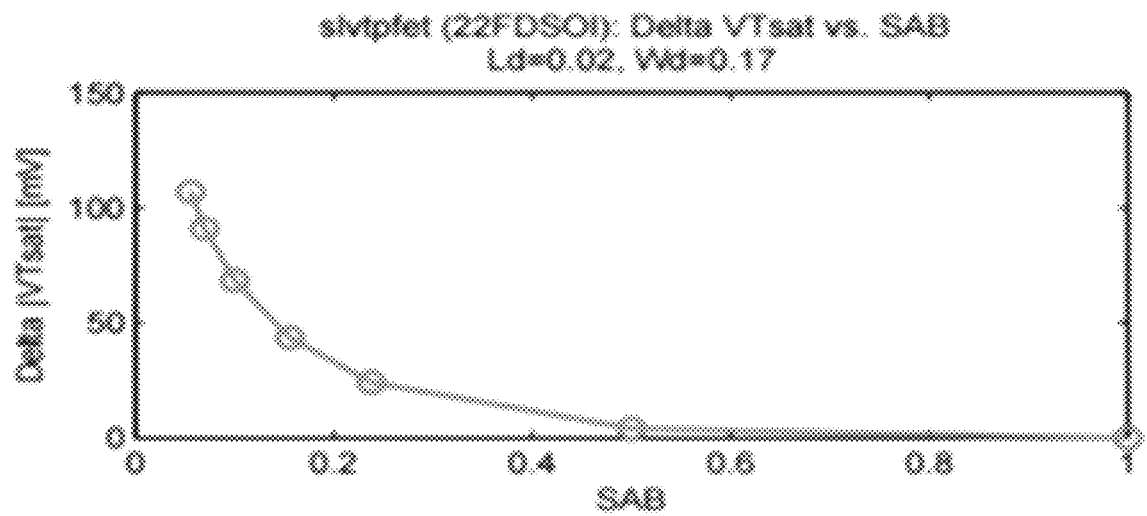
FIG. 6A is a graph illustrating the relationship between changes in source/drain area and threshold voltage.

In any case, within the cell library 151, at least some of the cells 152 can be associated with each other and, particularly, can be included in sets of cells (e.g., see sets A-N). All cells in a given set of cells can be essentially the same except for having different combinations of the cell boundary isolation structures. That is, each cell in the same set of cells will have the same internal structure (i.e., the same IC component, which, as discussed above, can be a single device or multiple interconnected devices), but a different combination of CNRX-type, DDB-type and SDB-type structures at the cell boundaries to provide isolation from adjacent cells in a layout (e.g., provide isolation from any cells abutting the end of the cell within the layout) so as to be associated with some different passive delay value. It should be understood that, since different cells in the same set have the same internal structure (i.e., the same IC component, which, as discussed above, can be a single device or multiple interconnected devices), the different delay values associated with different cells in the same set are referred to herein as "passive" delay values because they are not the result of actively making specific changes to the internal structure of each cell. That is, they are not the result of actively replacing FETs within the internal structure of the cell with different FETs having different sizes (i.e., different channel widths and/or channel lengths), they are not the result of actively adding delay devices (e.g., inverters and/or buffers) to the internal structure of the cell, etc. Instead, they are the result of using different combinations of cell boundary isolation structures that lead to different overall source/drain areas (SAB). Note, as illustrated in FIG. 6A (discussed in greater detail below) reducing the overall SAB of PFETs in a cell (e.g., by employing a different combination of cell boundary isolation structures) results in a corresponding increase in the PFET threshold voltage (VT) and, thus, passively (as opposed to actively) increases signal delay in the cell.

For example, FIGS. 2.1-2.9 illustrate nine cells in an exemplary set. Each cell 2.1-2.9 in the set has an internal structure including an active semiconductor region 201 and isolation regions (e.g., shallow trench isolation regions) abutting at least side edges of the active semiconductor region 201. Each cell 2.1-2.9 in this exemplary set can also include two series-connected p-type field effect transistors (PFETs) 210. Each PFET 210 can include, in the active semiconductor region 201, source/drain regions 212 and a channel region positioned laterally between the source/drain regions 212. The source/drain regions 212 can have P+ conductivity, The channel region can have N− conductivity or, alternatively, can be intrinsic (i.e., undoped) in, for example, the case of a fully-depleted silicon-on-insulator (FDSOI) PFET. In any case, each PFET 210 can also include a gate 211 traversing the active semiconductor region 201 adjacent to the channel region and further extending onto the adjacent isolation regions 205. As illustrated, the source/drain region 212 at the center of each cell shown in FIGS. 2.1-2.9 can be shared by the two PFETs 210.

As mentioned above, cells within the same set in the cell library 151 will have different combinations of cell boundary isolation structures. In this case, the cell 200.1 includes two first cell boundary isolation structures 221 (i.e., two CNRX-type structures) at opposite ends. The cell 200.2 includes two second cell boundary isolation structures 222 (i.e., two DDB-type structures) at opposite ends. The cell 200.3 includes two third cell boundary isolation structures (i.e., two SDB-type structures) at opposite ends. The cell 200.4 includes a second cell boundary isolation structure 222 (i.e., a DDB-type structure) and a first cell boundary isolation structure 221 (i.e., a CNRX-type structure) at opposite ends. The cell 200.5 includes a first cell boundary isolation structure 221 (i.e., a CNRX-type structure) and a second cell boundary isolation structure 222 (i.e., a DDB-type structure) at opposite ends. The cell 200.6 includes a third cell boundary isolation structure 223 (i.e., an SDB-type structure) and a first cell boundary isolation structure 221 (i.e., a CNRX-type structure) at opposite ends. The cell 200.7 includes a first cell boundary isolation structure 221 (i.e., a CNRX-type structure) and a third cell boundary isolation structure 223 (i.e., an SDB-type structure) at opposite ends. The cell 200.8 includes a third cell boundary isolation structure 223 (i.e., an SDB-type structure) and a second cell boundary isolation structure 222 (i.e., a DDB-type structure) at opposite ends. The cell 200.9 includes a second cell boundary isolation structure 222 (i.e., a DDB-type structure) and a third cell boundary isolation structure 223 (i.e., an SDB-type structure) at opposite ends.

It should be noted that, in each cell with a first cell boundary isolation structure 221 (i.e., a CNRX-type structure), the source/drain region 212 that is immediately adjacent to that first cell boundary isolation structure 221 is always connectible (e.g., see connection 250) to VDD. However, in each cell with a second or third cell boundary isolation structure 222-223 (i.e., a DDB or SDB-type structure), the source/drain region 212 that is immediately adjacent to that second or third cell boundary isolation structure 222-223 may or may not be connectible to VDD by a similar connection (as a function of the design). That is, in some cases, the adjacent source/drain region 212 may be connectible to VDD. In other cases, the adjacent source/drain region 212 may not be connectible to VDD. For example, although not shown, in some cases (e.g., in the case of an inverter), the source/drain region of a PFET within a cell could be connected (e.g., via a local interconnect) to an adjacent source/drain region of an N-type field effect transistor (NFET). The optional connectibility to VDD of any source/drain region 212 immediately adjacent to second or third-type cell boundary structure 222-223 (i.e., a DDB or SDB-type structure) is indicated in FIGS. 2.1-.29 by the dashed line connection structure.

In the design system 100, the processor 120 can develop (e.g., can execute program instructions 140 of an EDA tool, such as a schematics generation tool to develop) an initial design 111 for an integrated circuit (IC) based on user inputs (e.g., receive through a graphic user interface (GUI) 131 on a display 130) and further based on the stored design information. Development of the initial design 111 can specifically include selection of multiple cells 152 from the cell library 151 including standard cells and, optionally, parameterized cells (Pcells) and/or custom cells. Optionally, development of the initial design 111 could also include formation of customized cells (not shown). In any case, the initial design 111 can be represented by a high-level description, which sets out the requirements for the IC chip (including established timing constraints). This high-level description can be stored in memory 110 in, for example, a hardware description language (HDL), such as VHDL or Verilog.

The processor 120 can perform various physical design processes (e.g., can execute program instructions 140 of EDA tool(s), such as a floorplanning tool, a power planning tool, an input/output pin placement tool, a cell placement tool, a clock planning tool and a wire routing tool, to perform various physical design processes). These physical design processes can include, but are not limited to, floorplanning, power planning, input/output pin placement, cell placement, clock planning and wire routing in order to generate a layout 112 for the IC design. The layout 112 can further be stored in memory 110.

It should be noted that in the disclosed embodiments initial cell selection during generation of the initial design and cell placement can be timing-driven (e.g., to minimize data and clock signal delay) as well as driven by power consumption, area consumption, manufacturing efficiency and complexity, costs, etc. Thus, the cells selected and placed in an initial layout may primarily include CRNX-type and, optionally, DDB-type cell boundary structures because such structures are associated with lower passive delay, lower manufacturing complexity (e.g., due to continuous cell-to-cell semiconductor regions), etc.

Figure 3:
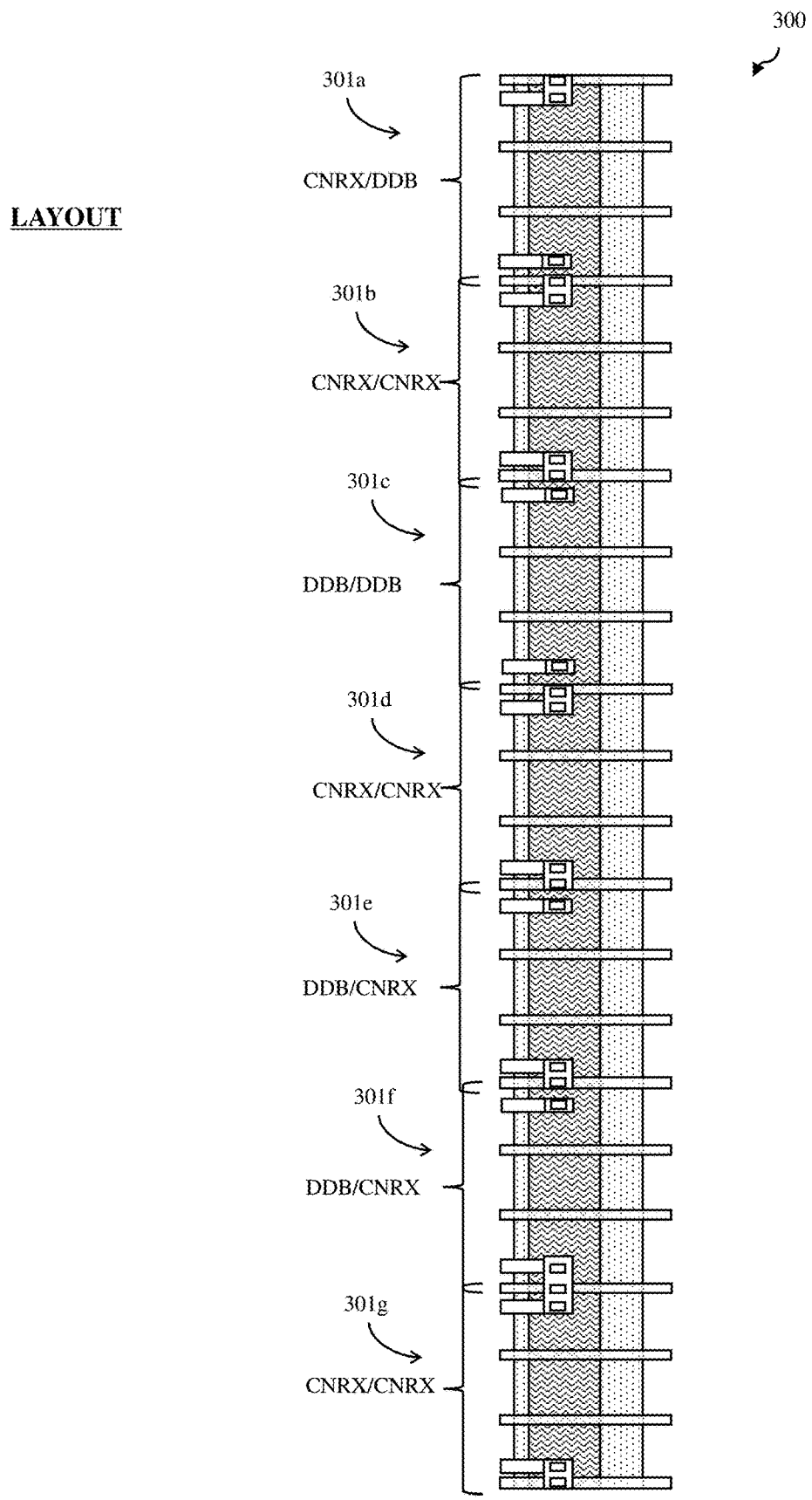
FIG. 3 is a diagram illustrating an exemplary layout (or portion thereof) of a design including cells selected from FIGS. 2.1-2.9.

For example, FIG. 3 is diagram illustrating an exemplary layout (or portion thereof) including seven cells 301a-301g, which were selected from the set in the cell library 151 that includes cells 200.1-200.9, described above, and which were placed in end-to-end alignment with cell 301a being the first cell and cell 301g being the last. Cell 301a represents an instance of cell 200.5, cell 301b represents an instance of cell 200.1, cell 301c represents an instance of cell 200.2, cell 301d represents another instance of cell 200.1, cells 301e and 301f represents instances of cell 200.4, and cell 301g represents yet another instance of cell 200.1. Thus, layout 300 only includes cells with CNRX-type and DDB-type cell boundary isolation structures. Furthermore, it should be noted that the gates and semiconductor material thereon of the CNRX-type and DDB-type cell boundary isolation structures of the cells 301a-301g in the layout 300 are shared between adjacent cells. That is, referring to the cells 200.1-200.9 of FIGS. 2.1-2.9 in combination with the layout 300 of FIG. 3, it should be noted that, in each CRNX-type structure 221, a gate 215 is located at one end of the cell overlaying an edge portion of the active semiconductor region 201 (which is configured essentially the same as the channel regions of the PFETs within the cell) and further electrically coupled to an immediately adjacent P+ source/drain region 212. Thus, a high voltage level (e.g., VDD) at the source/drain region and on the gate 215 coupled thereto, will prevent current from flowing to an adjacent cell (i.e., will electrically isolate the cell at issue from an adjacent cell). The gate and semiconductor material thereon of such a CNRX-type structure can be shared with the gate of an immediately adjacent CNRX-type structure or an immediately adjacent DDB-type structure of an adjacent cell. In each DDB-type structure 222, a gate 215 is similarly located at one end of the cell overlaying an N– edge portion of the active semiconductor region 201. However, since in such a DDB-type structure there is no coupling with the immediately adjacent P+ source/drain region 212 in the same cell, a DDB-type structure alone or a shared DDB-structure between adjacent cells would not provide the required electrical isolation. So, cell placement in the layout 300 is specifically performed using an algorithm that ensures DDB-type structures of adjacent cells are not shared and instead the semiconductor material and gate thereon of any DDB-type structure is shared with a CNRX-type structure of an adjacent cell. By having shared DDB-type and CNRX-type structure, the bias on the shared gate from the CNRX-type structure provides the required electrical isolation.

The processor 120 can further perform a timing analysis, such as a Static timing analysis (STA) (e.g., can execute program instructions 140 of an EDA tool, such as a timing analysis tool, to perform a timing analysis) in order to predict the timing performance of the layout. As a part of the timing analysis, the results can also be compared to the previously established timing constraints in order to identify any timing constraint violations.

The processor 120 can further perform timing closure (e.g., can execute program instructions 140 of an EDA tool, such as a timing closure tool, to perform timing closure. That is, when timing constraint violation(s) is/are identified during the timing analysis, timing closure can be performed, generating, and storing in memory 110, an updated layout 113 in which previously identified timing constraint violation(s) is/are fixed. However, in the disclosed embodiments, the program instructions can call for replacing cells, whenever possible, when a timing constraint can be fixed by adjusting signal delay.

Consider the layout 300 of FIG. 3. If timing analysis indicates a timing constraint violation that could be fixed by adjusting signal delay (e.g., either data or clock signal delay) in the layout 300, then the processor 120 can access the cell library 151 and replace one or more of the original cells 301a-301g with replacement cell(s), where each replacement cell is selected from the same set of cells in the cell library as the original cell it will be replacing to facilitate fixing (i.e., to fix or assist in fixing) at least timing constraint violation by adding delay or, alternatively, reducing delay. For example, if the timing analysis indicates a timing constraint violation (e.g., a hold time violation or some other timing constraint violation) that could be fixed by adding signal delay to the layout 300, then instead of inserting completely new buffer and/or inverter cell(s) (which increase power consumption as well as area consumption) into the layout 300 (e.g., between two or more of the cells 301a-301g), the processor 120 can access the cell library 151 and replace one or more of the original cells 301a-301g with replacement cell(s), where each replacement cell is selected from the same set of cells in the cell library as the original cell it will be replacing and is associated with a different passive delay value in order to facilitate fixing (i.e., to fix or assist in fixing) the timing constraint violation. As mentioned above, the CRNX-type structure 221 provides the least amount of passive signal delay, whereas the SDB-type structure 223 provides the most amount of passive signal delay. That is, SDB-type structure 223 causes higher signal delay than the DDB-type structure 222 and the DDB-type structure 222 causes higher signal delay than the CRNX-type structure 221. By replacing cells in the layout with cells that have different cell boundary isolation structures associated with higher signal delay, the system 100 allows for adding signal delay to the layout, while avoiding a concurrent increase in power consumption and at least limiting a concurrent increase in area consumption.

Figure 4:
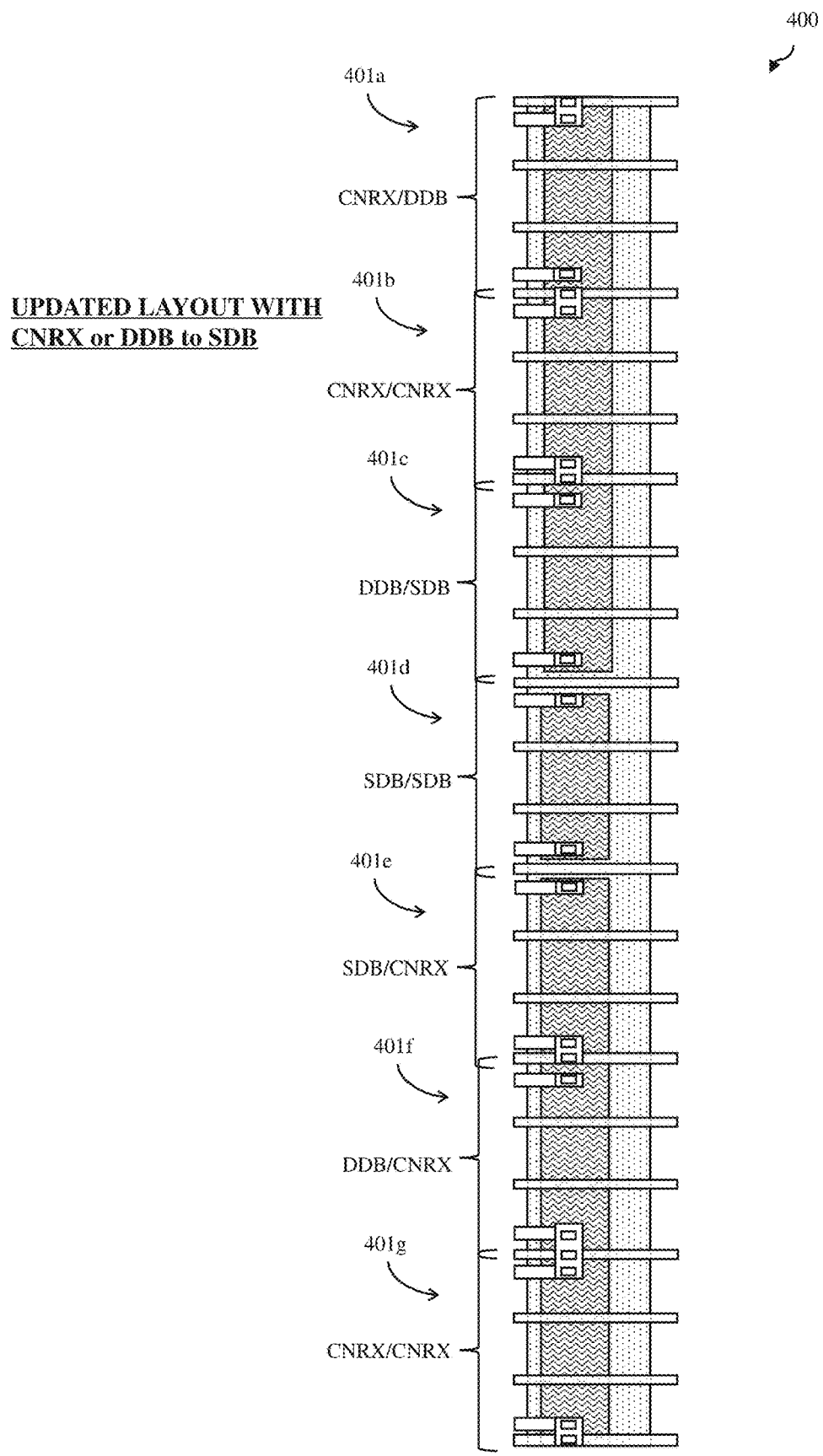
FIG. 4 is a diagram illustrating an updated layout in which selected cells from the layout of FIG. 3 have been replaced during timing closure.

In some embodiments, the updated layout can be generated during timing closure using a cell replacement algorithm that ensures any replacement cell includes only SDB-type structure(s) in place of CNRX-type structure(s) and/or DDB-type structure(s). Since initial cell placement was performed, as discussed above and illustrated in the exemplary layout 300, so that DDB-type structures from adjacent cells were not shared, then this cell replacement algorithm ensures that the updated layout will also not include adjacent cells with shared DDB-type structures. For example, FIG. 4 is diagram illustrating a layout 400 generated following timing closure of the layout 300 using an algorithm that ensures any replacement cell includes only SDB-type structure(s) in place of CNRX-type structure(s) and/or DDB-type structure(s) in order to add signal delay without inserting power consuming buffer and/or inverter cells. In this case, the updated layout 400, like the layout 300, includes seven cells 401a-401g with four of the cells being original cells from the layout 300 and with three of the cells being replacement cells, which were selected from the same set in the cell library in order to add signal delay as compared to the signal delay in the layout 300. Specifically, cell 401a (like cell 301a of the layout 300) represents an instance of cell 200.5 (i.e., FIG. 2.5), cell 401b (like cell 301b of the layout 300) represents an instance of cell 200.1 (i.e., FIG. 2.1), cell 401f (like cell 301f of the layout 300) represents an instance of cell 200.4 (i.e., FIG. 2.4), and cell 401g (like cell 301g of the layout 300) represents another instance of cell 200.1 (i.e., FIG. 2.1). Thus, these cells are the same (i.e., have not been replaced). However, cell 301c, which represented an instance of cell 200.2 (i.e., FIG. 2.2) with two DDB-type structures in the layout 300, has been replaced by cell 401c, which represents an instance of cell 200.9 (i.e., FIG. 2.9) with a DDB-type structure and an SDB-type structure in the updated layout 400 and thereby adds signal delay. Additionally, cell 301d, which represented an instance of cell 200.1 (i.e., FIG. 2.1) with two CNRX-type structures in the layout 300, has been replaced by cell 401d, which represents an instance of cell 200.3 (i.e., FIG. 2.3) with two SDB-type structures in the updated layout 400 and thereby adds signal delay. Finally, cell 301e, which represented an instance of cell 200.4 (i.e., FIG. 2.4) with a DDB-type structure and a CNRX-type structure in the layout 300, has been replaced by cell 401e, which represents an instance of cell 200.6 (i.e., FIG. 2.6) with an SDB-type structure and a CNRX-type structure in the updated layout 400 and thereby adds signal delay. By replacing cells with cells that have different cell boundary isolation structures associated with higher signal delay, this embodiment adds signal delay, while avoiding a concurrent increase in power consumption and also avoiding a concurrent increase in area consumption.

Figure 5:
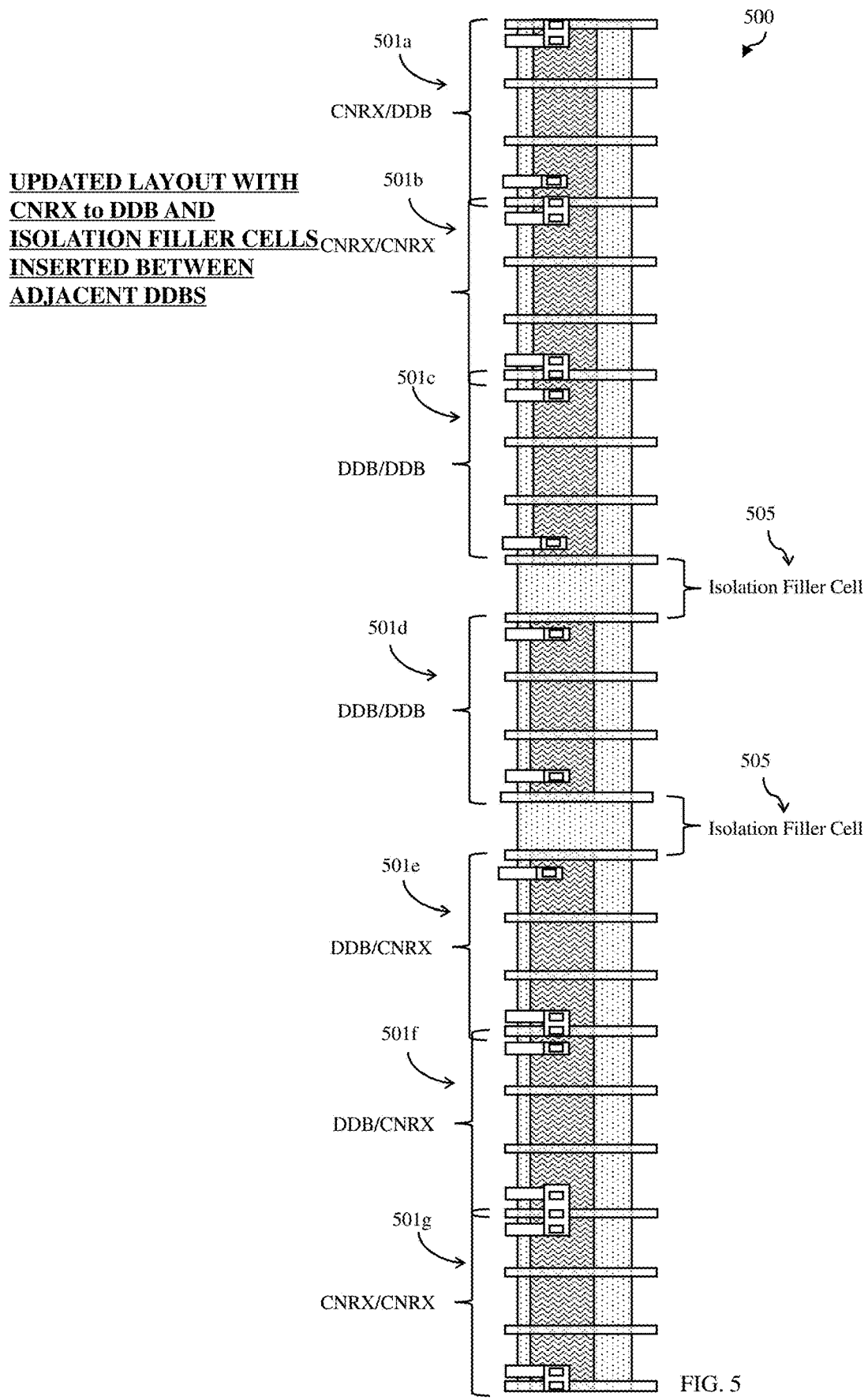
FIG. 5 is a diagram illustrating an alternative updated layout in which selected cells from the layout of FIG. 3 have been replaced during timing closure.

In other embodiments, the updated layout can be generated during timing closure using a cell replacement algorithm that allows a replacement cell to include DDB-type structure(s) in place of CNRX-type structure(s). Although initial cell placement was performed, as described above and illustrated in the exemplary layout shown in FIG. 3, so that DDB-type structures from adjacent cells were not shared, such a cell replacement algorithm could result in an updated layout where adjacent cells will have adjacent DDB-type structures. Since, as mentioned above, DDB-type structures alone do not provide required isolation, in this case the algorithm must further allow for insertion of an isolation filler cell between two cells if/when replacing at least one of the two cells would result immediately adjacent DBD-type structures. For example, FIG. 5 is diagram illustrating an updated layout 500 generated following timing closure of the layout 300 using an algorithm that allows a replacement cell to include DDB-type structure(s) in place of CNRX-type structure(s) in order to add signal delay without inserting power consuming buffer and/or inverter cells. In this case, the updated layout 500, like the layout 500, includes seven cells 501a-501g with four of the cells being the original cells from the layout and three of these cells being replacement cells, which were selected from the same set in the cell library in order to add signal delay as compared to the signal delay in the layout 300. The updated layout 500 also includes two additional cells and, particularly, isolation filler cells 505. Specifically, cell 501a (like cell 301a of the layout 300) represents an instance of cell 200.5 (i.e., FIG. 2.5), cell 501b (like cell 301b of the layout 300) represents an instance of cell 200.1 (i.e., FIG. 2.1), cell 501c (like cell 301c) represents an instance of cell 200.2 (i.e., FIG. 2.2), cells 501e and 501f (like cells 301e and 301f of the layout 300) represents instances of cell 200.4 (i.e., FIG. 2.4), and cell 501g (like cell 301g of the layout 300) represents another instance of cell 200.1 (i.e., FIG. 2.1). Thus, these cells are the same (i.e., have not been replaced). However, cell 301d, which represented an instance of cell 200.1 (i.e., FIG. 2.1) with two CNRX-type structures in the layout 300, has been replaced by cell 501d, which represents an instance of cell 200.2 (i.e., FIG. 2.2) with two DDB-type structures in the updated layout 500 and thereby adds signal delay. However, since the updated layout 500, the DDB-type structures in the cell 501d are adjacent to DDB-type structures in adjacent cells 501c and 501e, isolation filler cells 505 are inserted between cell 501c and 501d and between 501d and 501e. Each isolation filler cell 505 can include a shallow trench isolation (STI) region that extends between and physically separates DDB-type structures of the adjacent cells. By replacing cells with cells that have different cell boundary isolation structures associated with higher signal delay, this embodiment adds signal delay, while avoiding a concurrent increase in power consumption and limiting any concurrent increase in area consumption. That is, even though this embodiment may result in the need for isolation filler cells, such isolation filler cell do not result in an increase in power consumption. Furthermore, while isolation filler cell(s) would result in an increase in area consumption, the increase is area consumption is less than that seen with the insertion of buffer and/or inverter cell(s).

To the extent possible replacing cells should be performed during timing closure, as described above, in order to minimize layout modifications that will cause increases in power and/or area consumption. However, if/when replacing cells with other cells from the same set in the cell library 151 proves insufficient to fix all timing constraint violations, any other suitable layout modifications (e.g., switching cells so the size of device(s) therein are smaller or larger, adding cells, etc.) could be made in order to ensure that an IC manufactured according to a subsequently generated final IC design will, to some sufficiently high degree of probability, function properly.

It should be noted that switching from a first cell boundary isolation structure 221 (i.e., a CNRX-type structure) to a second or third cell boundary isolation structure 222 or 223 (i.e., a DDB-type or SDB-type structure) or by switching from a second cell boundary isolation structure 222 (i.e., a DDB-type structure) to a third cell boundary isolation structure 223 (i.e., an SDB-type structure) results in a reduction in the overall source/drain area (SAB) of the cell. Specifically, the area of a given source/drain region 212 of a PFET can be measured from the PFET gate to the end of the of the source/drain region in a direction perpendicular to the gate. If the PFET is bordered by a first cell boundary isolation structure 221 (i.e., a CNRX-type structure), then the source/drain region 212 extends under and beyond the gate of the CNRX-type structure. If the PFET is bordered by a second cell boundary isolation structure 222 (i.e., a DDB-type structure), then the source/drain region 212 ends at the isolation region below the gate of the DDB-type structure and, thus, has a smaller area. If the PFET is bordered by a third cell boundary isolation structure 223 (i.e., an SDB-type structure), then the source/drain region 212 ends at the isolation region before the gate of the SDB-type structure and, thus, has an even smaller area. If one or both of the source/drain regions 212 adjacent to the cell boundaries are reduced in area, the overall source/drain area will also be reduced.

Figure 6B:
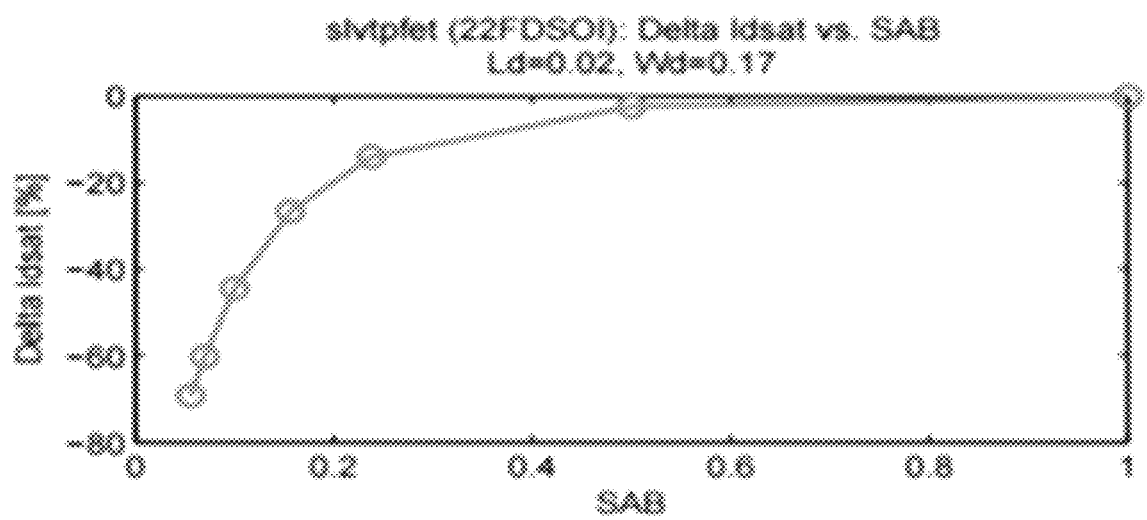
FIG. 6B is a graph illustrating the relationship between changes in source/drain area and saturation drain current.

FIGS. 6A and 6B illustrate the impact of reducing SAB on PFET threshold voltage (VT) and on PFET saturation drain current (IDsat), respectively, in an exemplary cell where the PFETs are super low threshold voltage (SLVT) PFETS formed at the 22 nm FDSOI technology node. As indicated, by reducing SAB, VT can be decreased and thus, so can delay. Therefore, during timing closure, cells with relatively large SABs can be replaced by cells with relatively small SABs to increase delay in order to meet particular timing requirements where added delay is necessary. Furthermore, this technique has the added benefit of reducing power consumption. That is, by replacing cells that have relatively large SABs with cells that have relatively small SABs, IDsat is reduced and thus, so is power consumption. In other words, in the disclosed embodiments, delay can be added without using active devices that increase both area and power consumptions and, more particularly, delay can be added using a technique that reduces both area and power consumption.

The processor 120 can further perform various design verification processes (e.g., can execute program instructions 140 of an EDA tool, such as a layout versus schematic (LVS) tool, a 3D emulation tool, an electromigration and voltage drop verification tool, etc.).

Those skilled in the art will recognize that, as the layout is modified/updated at the different design stages, the above-described processes can be iteratively repeated. When no additional modifications/updates are deemed necessary, the processor 120 can generate, and store in memory 110, a final IC design layout 114. The final IC design layout 114 can be in a data format used for the exchange of layout data of integrated circuits and/or symbolic data format (e.g., GDSII, GL1, OASIS, map files, or any other suitable format for storing such design data structures) and subsequently released to tape-out. That is, it can be released and used to manufacture chips according to the design.

Figure 7:
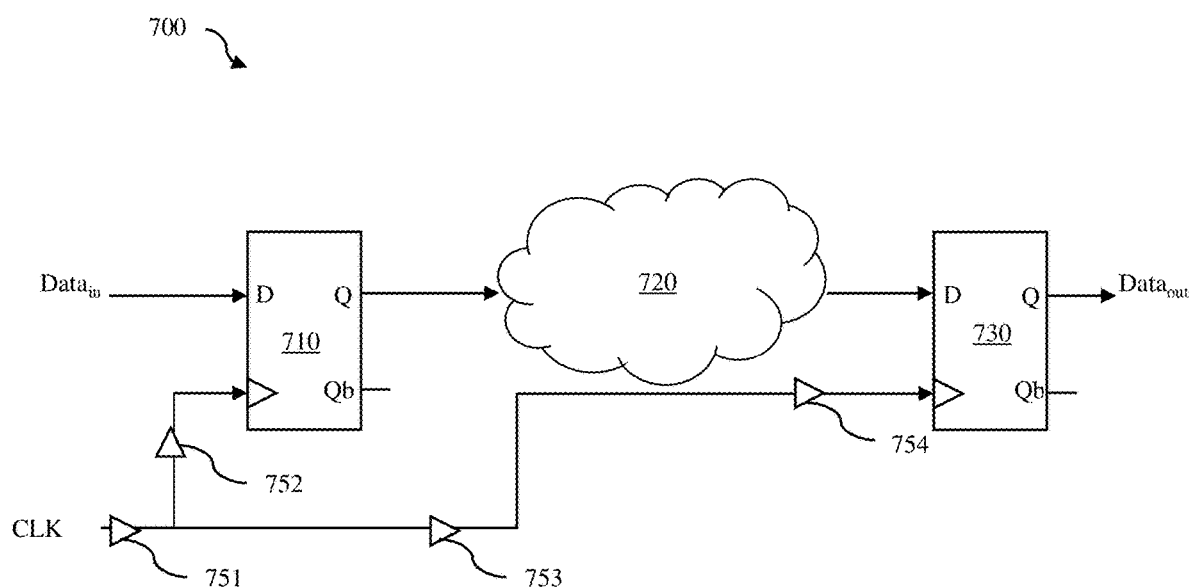
FIG. 7 is a schematic diagram illustrating a logic circuit that can be subjected to timing closure using the cell replacement technique of the system and method embodiments disclosed herein.

The design system 100, described in detail above, could, for example, be employed in the design of a logic circuit, such as the logic circuit 700 illustrated in FIG. 7.

Specifically, FIG. 7 is a schematic diagram illustrating a basic logic circuit 700. The logic circuit 700 can include a first flop-flop 710 (also referred to herein as a launch flop) with a first data input (D), a first data output (Q), and a first clock signal input. The logic circuit 700 can also include a second flip-flop 730 (also referred to herein as a capture flop) with a second data input (D), a second data output (Q), and a second clock signal input. The logic circuit 700 can further include logic elements 720 (including combinational and/or sequential logic elements in the form of standard cells and/or Pcells) connected between the first data output (Q) of the first flop-flop 710 and the second data input (D) of the second flip-flop 730. The logic circuit 700 can further include a clock signal path from a clock signal generator and branching to both the first clock signal input of the first flip-flop 710 and the second clock signal input of the second flip-flop 730. The clock signal path can include one or more logic gates (e.g., buffers or inverters). These logic gates can include, but are not limited to: an initial logic gate 751 and, particularly, a clock buffer or inverter receiving the clock signal (CLK); a first local logic gate 752 and, particularly, a local clock buffer or inverter connected in series between the initial logic gate 751 and the first flip-flop (i.e., in the branch directly upstream of the first clock signal input to the first flip-flop 710); an intermediate logic gate 753 and, particularly, a clock buffer or inverter connected in series with the initial logic gate 751; and a second local logic gate 754 and, particularly, a local clock buffer or inverter connected in series between the intermediate logic gate 753 and the second flip-flop 730 (i.e., in the branch directly upstream of the second clock signal input to the second flip-flop 730).

The processor 120 can develop an initial design for the logic circuit 700 (including cell selection for the logic circuit, development of a high-level description of the logic circuit, and establishment of timing constraints for the logic circuit). The timing constraints such a logic circuit 700 can include, for example, setup and hold time requirements for the flip-flops 710 and 730.

The processor 120 can perform physical design processes to generate a layout for the logic circuit 700. The processor 120 can further perform a timing analysis (e.g., an STA) based on the layout for the logic circuit 700. In this case, the STA can specifically be used to predict the setup and hold times in the flop-to-flop data path through logic elements 720 and the results of STA can be compared to the previously established setup and hold time requirements in order to identify any setup and hold time violations in the flop-to-flop data path.

The processor 120 can further perform timing closure, modifying the layout of the logic circuit 700 in order to fix the identified timing constraint violations and, thereby to ensure that a logic circuit manufactured according to a final logic circuit design will, to some sufficiently high degree of probability, function properly.

As mentioned above, hold time refers to the minimum amount of time after the clock signal's active edge that data must be stable for it to be correctly latched. The present invention and, particularly, the above-described cell replacement technique could be employed to facilitate fixing (i.e., to fix or to assist in fixing) hold time constraint violations in such a logic circuit during timing closure. For example, if the timing analysis reveals a violation of a hold time constraint for the second flip-flop 730, timing closure can include replacing one or more of the cells in the logic elements region 720 between the first data output (Q) of the first flip-flop 710 and the second data input of the second flip-flop 730 to fix or at least assist in fixing the hold time constraint violation. Specifically, the processor 120 can access the cell library 151 and can replace one or more of the original cells placed along the flop-to-flop data path (i.e., in the logic elements region 720). Adding delay to the data signal within the logic elements region 720 is one technique that can be used to fix or assist in fixing such a hold time constraint violation. Thus, in this case, each replacement cell can be selected from the same set of cells in the cell library 151 as the original cell it will be replacing and can further be selected so that it has cell boundary isolation structures associated with a smaller source/drain area (SAB) and thereby a greater passive delay value than that of the original cell it will be replacing. Additionally, or alternatively, timing closure to fix a hold time constraint violation can also include using the above-described cell replacement technique to add delay to a clock signal at the first clock signal input to the first flip-flop 710 (e.g., by replacing a cell in the buffer/inverter 752) and/or to a data signal at the first data output Q of the first flip-flop 710 (e.g., by replacing a cell in the first flip-flop 710 somewhere from clock-to-Q).

Also as mentioned above, setup time refers to the minimum amount of time required before the clock signal's active edge (also referred to as the capturing edge of the clock signal) that data must be stable for it to be correctly latched. The present invention and, particularly, the above-described cell replacement technique could also be employed to facilitate fixing (i.e., to fix or to assist in fixing) set-up time constraint violations in such a logic circuit during timing closure. For example, if the timing analysis reveals a violation of a set-up time constraint for the second flip-flop 730, timing closure can include adding delay to the clock signal at the second clock signal input to the second flip-flop 730 (e.g., by replacing a cell in the buffer/inverter 754).

The processor 120 can subsequently perform the above-mentioned design verification processes and generate a final design layout for the logic circuit.

Figure 8:
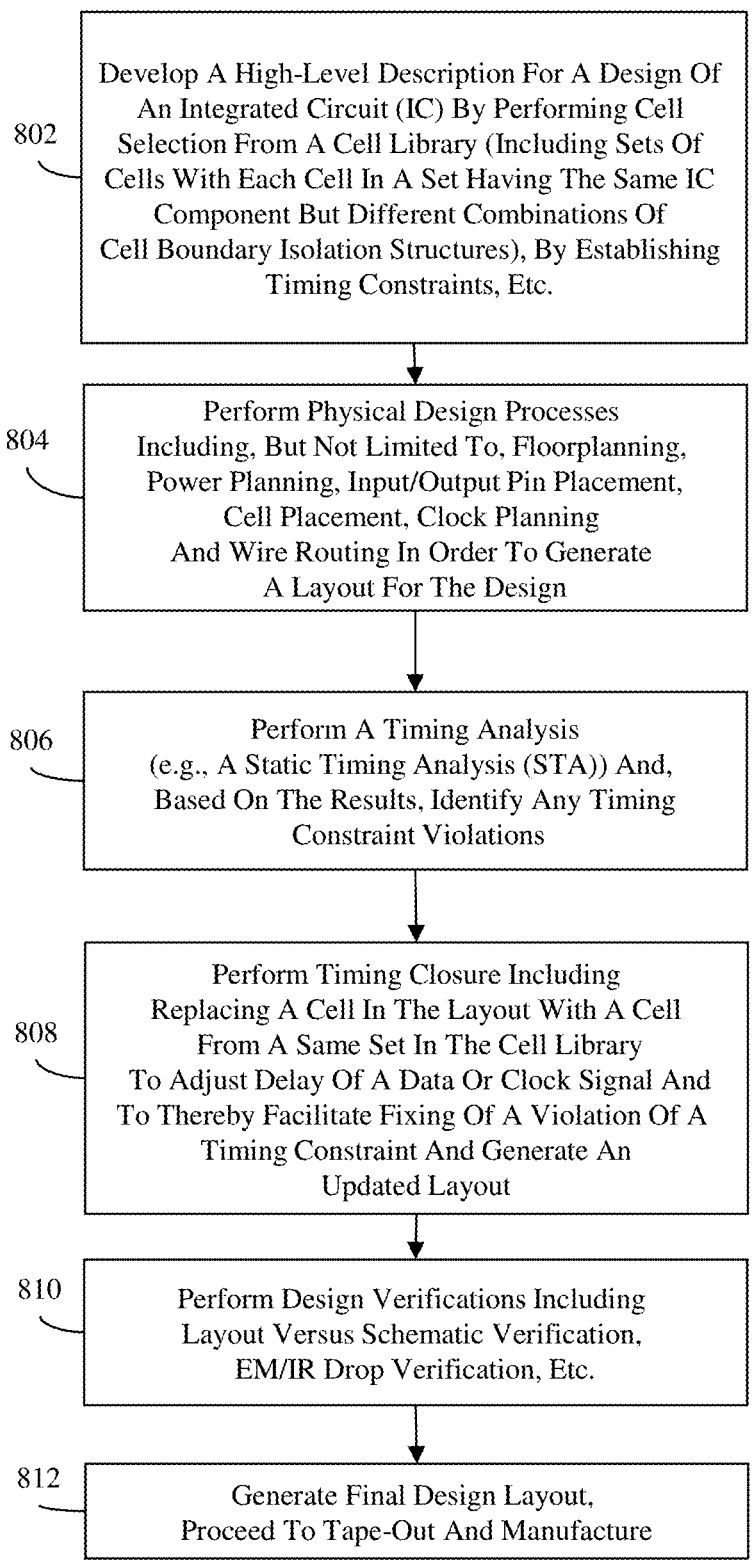
FIG. 8 is flow diagram illustrating embodiments of design method including power-optimized timing closure.

Referring to the flow diagram of FIG. 8 in combination with the system diagram of FIG. 1, also disclosed herein are embodiments of a design method including power-optimized timing closure (e.g., power optimized hold time closure of a flip-to-flop data path in a logic circuit).

The method embodiments can include storing, in a memory 110, sets of program instructions 140, which are readable by a processor 120 and which can be executed by a processor 120 during different stages in a design flow (see the detail discussion of the program instructions above with regard to the system embodiments).

The method embodiments can further include storing, in memory 110, design information 150, which is accessible by a processor 120 and usable during different stages in the design flow. The design information 150 can be in the form, for example, of a process design kit (PDK) and can include, but is not limited to, technology files 155 for a specific technology node, rule decks 156, and a cell library 151.

As discussed above, with regard to the system embodiments, the cell library 151 is a database that defines multiple different cells 152 and the symbols thereof that can be incorporated into a schematic diagram of an IC under design in the specific technology node. Each cell can represent an IC component. The IC component can be a single device (e.g., a transistor, capacitor, resistor, etc.) or other feature (e.g., an isolation region, etc.) or multiple interconnected devices (e.g., a logic gate) or features. Each cell 152 can further be associated with additional design information optionally including, but not limited to, timing, power and noise information. The cells 152 in the cell library 151 can include standard cells 152 and, optionally, parameterized cells (Pcells) and/or custom cells. Such cells are well known in the art and, thus, the details thereof have been omitted from this specification in order to allow the reader to focus on the salient aspects of the disclosed embodiments.

In any case, in addition to an IC component, the cells can further have cell boundary isolation structures for providing isolation from adjacent cells placed in a layout, as discussed in greater detail below. These cell boundary isolation structures can be any of three different structures. A first cell boundary isolation structure (also referred to herein as a continuous active semiconductor (CNRX)-type structure) includes a gate at one end of the cell overlaying an edge portion of the active semiconductor region and further electrically coupled to the immediately adjacent inner portion of the active semiconductor region having a different type conductivity than the edge portion. Depending upon the voltage level at the immediately adjacent inner portion of the active semiconductor region and on the gate coupled thereto, current can be prevented from flowing to an adjacent cell. A second cell boundary isolation structure (also referred to herein as a double diffusion break (DDB)-type structure) includes a gate at one end of the cell overlaying an edge portion of the active semiconductor region, like the CNRX-type structure except that the gate and the immediately adjacent inner portion of the active semiconductor region are not electrically coupled. A third cell boundary isolation structure (also referred to herein as a single diffusion break (SDB)-type structure) can include a gate overlaying an isolation region. That is, in an SDB-type structure, the edge portion of the active semiconductor region does not extend under the gate at the end of the cell. The gates in such cell boundary isolation structures are also referred to herein as "dummy" or "non-functional" gates. Such dummy or non-functional gates at opposite ends of a cell can be concurrently formed with and parallel to field effect transistor (FET) gates such that they have essentially the same structure as the FET gates without being a terminal of a functional FET within the cell.

It should be noted that, when such cell boundary isolation structures are employed in p-type field effect transistor (PFET) devices areas, they all inherently provide some degree of passive signal delay due to the associated strain and its impact on charge carrier (i.e., hole) mobility in the PFETs. The CRNX-type structure provides the least amount of passive signal delay, whereas the SDB-type structure provides the most amount of passive signal delay. That is, SDB-type structure causes higher signal delay than the DDB-type structure and the DDB-type structure causes higher signal delay than the CRNX-type structure. See also the discussion of FIGS. 6A and 6B (above) regarding changes overall PFET source/drain area (e.g., as a function of changing the cell boundary isolation type) and the corresponding changes in PFET threshold voltage (VT) and saturation drain current (IDsat).

Furthermore, in the cell library 151, at least some of the cells 152 can be associated with each other and, particularly, can be included in sets of cells (e.g., see sets A-N). All cells in a given set of cells can be essentially the same except for having different combinations of the cell boundary isolation structures. That is, each cell in the same set of cells will have the same internal structure (i.e., the same IC component, which, as discussed above, can be a single device or multiple interconnected devices), but a different combination of CNRX-type, DDB-type and SDB-type structures at the cell boundaries to provide isolation from adjacent cells in a layout (e.g., provide isolation from any cells abutting the end of the cell within the layout) so as to be associated with some different passive delay value. As discussed above, since different cells in the same set have the same internal structure, the different delay values associated with different cells in the same set are referred to herein as "passive" delay values because they are not the result of actively making specific changes to the internal structure of each cell. Instead, they are the result of using different combinations of cell boundary isolation structures that lead to different overall source/drain areas (SAB). Note, as illustrated in FIG. 6A (discussed in greater detail below) reducing the overall SAB of PFETs in a cell (e.g., by employing a different combination of cell boundary isolation structures) results in a corresponding increase in the PFET threshold voltage (VT) and, thus, passively (as opposed to actively) increases signal delay in the cell. For example, see the different cells 200.1-200.9 of FIGS. 2.1-2.9 in the same set (i.e., having the same internal but different combinations of cell boundary isolation structures), as described in detail above.

The method embodiments can further include developing (e.g., by a processor 120 executing program instructions 140 of an EDA tool) an initial design 111 for an integrated circuit (IC) based on user inputs (e.g., receive through a graphic user interface (GUI) 131 on a display 130) and further based on the stored design information (see process 802). Development of the initial design 111 can specifically include selection of multiple cells 152 from the cell library 151 including standard cells 152 and, optionally, parameterized cells (Pcells). Optionally, development of the initial design 111 can also include the use of custom cells. In any case, the initial design 111 can be represented by a high-level description, which sets out the requirements for the IC chip (including established timing constraints). This high-level description can be stored in memory 110 in, for example, a hardware description language (HDL), such as VHDL or Verilog.

The method embodiments can further include performing (e.g., by a processor 120 executing program instructions 140 of EDA tool(s)) various physical design processes including, but are not limited to, floorplanning, power planning, input/output pin placement, cell placement, clock planning and wire routing in order to generate a layout for the IC design (see process 804 and the layout 300 of FIG. 3, described in detail above).

It should be noted that cell selection at process 802 and cell placement at process 804 can be timing-driven (e.g., to minimize data and clock signal delay) as well as driven by power consumption, area consumption, manufacturing efficiency and complexity, costs, etc. Thus, the cells selected and placed in an initial layout at processes 802-804 may primarily include CRNX-type and, optionally, DDB-type cell boundary structures because such structures are associated with lower passive delay, lower manufacturing complexity (e.g., due to continuous cell-to-cell semiconductor regions), etc.

The method embodiments can further include performing (e.g., by a processor 120 executing program instructions 140 of an EDA tool) a timing analysis, such as a Static timing analysis (STA), based on the layout (see process 806). Specifically, this timing analysis can be performed in in order to predict the timing performance of the layout. Additionally, at process 806, the results of the timing analysis can be compared to the previously established timing constraints from process 802 in order to identify any timing constraint violations.

The method embodiments can further include performing (e.g., by a processor 120 executing program instructions 140 of an EDA tool) timing closure (see process 808). That is, when timing constraint violation(s) is/are identified during the timing analysis at process 806, timing closure can be performed at process 808 to generate, and store in memory 110, an updated layout 113 in which previously identified timing constraint violation(s) is/are fixed. However, in the disclosed embodiments, this timing closure process can specifically include replacing cells, whenever possible, when a timing constraint can be fixed by adjusting signal delay.

Consider the layout 300 of FIG. 3. If timing analysis at process 806 predicts a timing constraint violation that could be fixed, during timing closure at process 808, by adjusting signal delay (e.g., either data or clock signal delay) in the layout 300, then one or more of the original cells 301a-301g could be replaced by replacement cell(s), where each replacement cell is selected from the same set of cells in the cell library 151 as the original cell it will be replacing to facilitate fixing (i.e., to fix or assist in fixing) at least timing constraint violation by adding delay or, alternatively, reducing delay. For example, if the timing analysis at process 806 predicts a timing constraint violation (e.g., a hold time violation or some other timing constraint violation) that could be fixed by adding signal delay to the layout 300, then instead of inserting completely new buffer and/or inverter cell(s) (which increase power consumption as well as area consumption) into the layout 300 (e.g., between two or more of the cells 301a-301g), one or more of the original cells 301a-301g can replaced with replacement cell(s), where each replacement cell is selected from the same set of cells in the cell library as the original cell it will be replacing and is associated with a different passive delay value in order to facilitate fixing (i.e., to fix or assist in fixing) the timing constraint violation. As mentioned above, the CRNX-type structure 221 provides the least amount of passive signal delay, whereas the SDB-type structure 223 provides the most amount of passive signal delay. That is, SDB-type structure 223 causes higher signal delay than the DDB-type structure 222 and the DDB-type structure 222 causes higher signal delay than the CRNX-type structure 221. By replacing cells in the layout with cells that have different cell boundary isolation structures associated with higher signal delay, the system 100 allows for adding signal delay, while avoiding a concurrent increase in power consumption and at least limiting a concurrent increase in area consumption.

In some embodiments, the updated layout can be generated during timing closure at process 808 using a cell replacement algorithm that ensures any replacement cell includes only SDB-type structure(s) in place of CNRX-type structure(s) and/or DDB-type structure(s). Since initial cell placement was performed, as described above and illustrated in the exemplary layout 300, so that DDB-type structures from adjacent cells were not shared, then such a cell replacement algorithm ensures that the updated layout will also not include adjacent cells with shared DDB-type structures. See the detailed discussion of the updated layout 400 of FIG. 4 above.

In other embodiments, the updated layout can be generated during timing closure at process 808 using a cell replacement algorithm that allows a replacement cell to include DDB-type structure(s) in place of CNRX-type structure(s). Although initial cell placement was performed, as described above, and illustrated in the exemplary layout 300, so that DDB-type structures from adjacent cells were not shared, such a cell replacement algorithm could result in an updated layout where adjacent cells will have adjacent DDB-type structures. Since, as mentioned above, DDB-type structures alone do not provide required isolation, in this case the algorithm must further allow for insertion of an isolation filler cell between two cells if/when replacing at least one of the two cells would result immediately adjacent DBD-type structures. See the detailed discussion of the updated layout 500 of FIG. 5 above.

It should be noted that, to the extent possible replacing cells should be performed during timing closure at process 808, as described above, in order to minimize layout modifications that will cause increases in power and/or area consumption. However, if/when replacing cells with other cells from the same set in the cell library 151 proves insufficient to fix all timing constraint violations, any other suitable layout modifications (e.g., switching cells so the size of device(s) therein are smaller or larger, adding cells, etc.) could be made in order to ensure that an IC manufactured according to a subsequently generated final IC design will, to some sufficiently high degree of probability, function properly.

The method embodiments can further include performing (e.g., by a processor 120 executing program instructions 140 of an EDA tool) various design verification processes including, but not limited to, layout versus schematic verification, a 3D emulation verification, an electromigration and voltage drop verification, etc. (see process 810).

Those skilled in the art will recognize that, as the layout is modified/updated at the different design stages, the above-described processes can be iteratively repeated. When no additional modifications/updates are deemed necessary, then a final IC design layout 114 can be generated and stored in memory 110 (see process 812). The final IC design layout 114 can be in a data format used for the exchange of layout data of integrated circuits and/or symbolic data format (e.g., GDSII, GL1, OASIS, map files, or any other suitable format for storing such design data structures) and subsequently released to tape-out. That is, it can be released and used to manufacture chips according to the design.

It should be noted that the processes 802-812 described above can, for example, be used in the design of a logic circuit, such as the logic circuit 700 described in detail above illustrated in FIG. 7. That is, at process 802, an initial design for the logic circuit 700 (including cell selection for the logic circuit, development of a high-level description of the logic circuit, and establishment of timing constraints for the logic circuit) can be developed. The timing constraints can include, for example, setup and hold time requirements for the flip-flops 710 and 730. Physical design processes can then be performed at process 804 to generate a layout for the logic circuit 700. A timing analysis (e.g., an STA) can be performed at process 806 based on the layout for the logic circuit 700. In this case, the STA can specifically be used to predict the setup and hold times in the flop-to-flop data path and the results of STA can be compared to the previously established setup and hold time requirements in order to identify any setup and hold time violations in the flop-to-flop data path.

At process 808, timing closure can be performed during which the layout of the logic circuit 700 is modified (i.e., an updated layout is generated) in order to fix any identified timing constraint violations and, thereby ensure that a logic circuit manufactured according to a final logic circuit design will, to some sufficiently high degree of probability, function properly.

For example, if the timing analysis reveals a violation of the hold time constraint for the second flip-flop 730, then timing closure at process 808 can fix or at least assist in fixing the hold time constraint for the second flip-flop 730 by replacing one or more of the cells in the flop-to-flop data path (i.e., in the logic elements region 720) between the first data output (Q) of the first flip-flop 710 and the second data input of the second flip-flop 730. Each replacement cell can be selected from the same set of cells in the cell library 151 as the original cell it will be replacing and can further be selected so that it has cell boundary isolation structures associated with a greater passive delay value than that of the original cell it will be replacing in order to add delay to the data signal in the flop-to-flop data path. Additionally, or alternatively, timing closure to fix a hold time constraint violation can also include using the above-described cell replacement technique to add delay to a clock signal at the first clock signal input to the first flip-flop 710 (e.g., by replacing a cell in the buffer/inverter 752) and/or to a data signal at the first data output Q of the first flip-flop 710 (e.g., by replacing a cell somewhere within the first flip-flop 710 from clock-to-Q).

Also, for example, if the timing analysis reveals a violation of a set-up time constraint for the second flip-flop 730, timing closure can include adding delay to a clock signal at the second clock signal input to the second flip-flop 730 (e.g., by replacing a cell in the buffer/inverter 754).

Subsequently, at process 810, various design verification processes can be performed and at process 712 a final logic circuit design layout can be generated.

Also disclosed herein are embodiments of a computer program product. This computer program product can include a non-transitory computer readable storage medium with program instructions embodied therewith (e.g., stored thereon). These program instructions can further be executable by a processor in order to cause the processor to perform the above-described methods. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
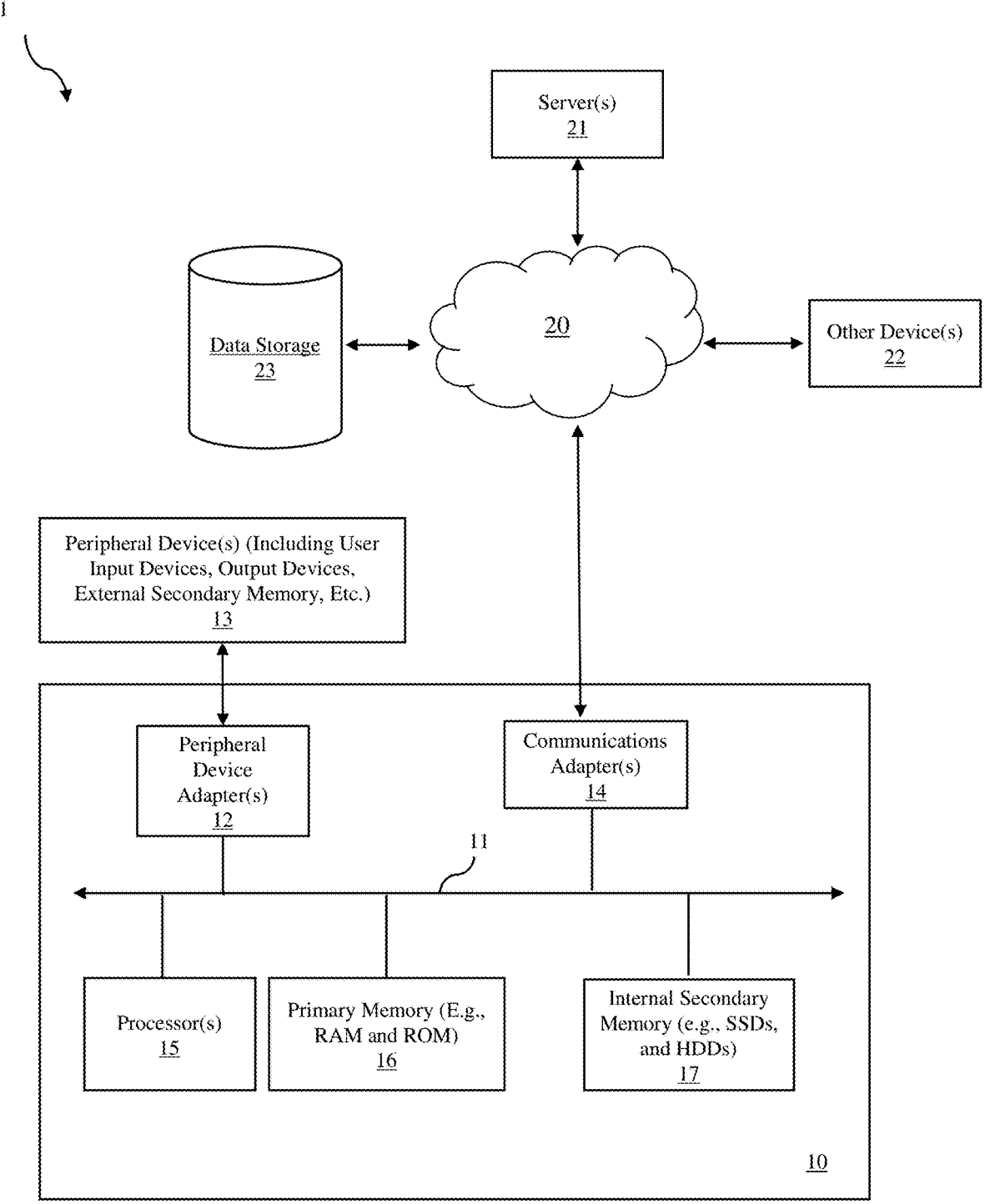
FIG. 9 is a schematic diagram illustrating an exemplary hardware environment for implementing aspects of the disclosed embodiments.

An exemplary hardware environment 1 for implementing aspects of the disclosed embodiments is depicted in FIG. 9. Generally, the hardware environment can include at least one computing device 10 (also referred to herein as a computer). The computer 10 can be, for example, a desktop, laptop, tablet, mobile computing device, etc. The computer 10 can include at least one bus 11. The bus 11 can be connected to various other components of the computer 10 and can be configured to facilitate communication between those components.

The computer 10 can include various adapters. The adapters can include one or more peripheral device adapters 12, which are configured to facilitate communications between one or more peripheral devices 13, respectively, and the bus 11. The peripheral devices 13 can include user input devices configured to receive user inputs. User input devices can include, but are not limited to, a keyboard, a mouse, a microphone, a touchpad, a touchscreen, a stylus, bio-sensor, a scanner, or any other type of user input device. The peripheral devices 13 can also include additional input devices, such as external secondary memory devices (as discussed in greater detail below). The peripheral devices 13 can also include output devices. The output devices can include, but are not limited to, a printer, a monitor, a speaker, or any other type of computer output device. The adapters can include one or more communications adapters 14 (also referred to herein as a computer network adapters), which are configured to facilitate communications between the computer 10 and one or more communications networks 20 (e.g., a wide area network (WAN), a local area network (LAN), the internet, a cellular network, a Wi-Fi network, etc.). Such network(s) 20 can, in turn, facilitate communications between the computer 10 and other system components on the network: remote server(s) 21, other device(s) 22 (e.g., computers, laptops, tablets, mobile phones, etc.), remote data storage 23, etc.

The computer 10 can further include at least one processor 15 (also referred to herein as a central processing units (CPU)). Optionally, each CPU 15 can include a CPU cache. Each CPU 15 can be configured to read and execute program instructions.

The computer 10 can further include memory and, particularly, computer-readable storage mediums. The memory can include primary memory 16 and secondary memory. The primary memory 16 can include, but is not limited to, random access memory (RAM) (e.g., volatile memory employed during execution of program operations) and read only memory (ROM) (e.g., non-volatile memory employed during start-up). The RAM can include, but is not limited to, dynamic random access memory (DRAM), static random access memory (SRAM), or any other suitable type of RAM. The ROM can include, but is not limited to, erasable programmable read only memory (EPROM), flash memory, electronically erasable programmable read only memory (EEPROM), programmable read only memory (PROM), or any other suitable type of ROM. The secondary memory can be non-volatile. The secondary memory can include internal secondary memory 17, such as internal solid state drive(s) (SSD(s)) and/or internal hard disk drive(s) (HDD(s), installed within the computer 10 and connected to the bus 11. The secondary memory can also include external secondary memory connected to or otherwise in communication with the computer 10 (e.g., peripheral devices). The external secondary memory can include, for example, external/portable SSD(s), external/portable HDD(s), flash drive(s), thumb drives, compact disc(s) (CD(s)), digital video disc(s) (DVD(s)), network-attached storage (NAS), storage area network (SAN), or any other suitable non-transitory computer-readable storage media connected to or otherwise in communication with the computer 10. The different functions of primary and secondary memory are well known in the art and, thus, the details thereof have been omitted from this specification in order to allow the reader to focus on the salient aspects of the disclosed embodiments.

In some embodiments, program instructions for performing the disclosed method or a portion thereof, as described above, can be embodied in (e.g., stored in) secondary memory accessible by the computer 10. When the program instructions are to be executed (e.g., in response to user inputs to the computer 10), required information (e.g., the program instructions and other data) can be loaded into the primary memory (e.g., stored in RAM). The CPU 15 can read the program instructions and other data from the RAM and can execute the program instructions. In other embodiments, a client-server model can be employed. In this case, the computer 10 can be a client and a remote server 21 in communication with the computer 10 over a network 20 can provide, to the client, a service including execution of program instructions for performing the disclosed method or a portion thereof, as described above, in response to user inputs the computer 10.

It should be understood that the above-described exemplary hardware environment is not intended to be limiting. Alternatively, any other suitable hardware for implementing aspects of the disclosed systems, methods and computer program products could be employed.

It should further be understood that the embodiments described above are used in the design and fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should further be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

Finally, it should be understood that the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory storing a cell library,
        wherein the cell library includes sets of cells with all cells in a set of cells having different combinations of cell boundary isolation structures associated with different delay values, and with each cell in each set having opposite ends and, at the opposite ends, two cell boundary isolation structures of at least three different types of possible cell boundary isolation structures,
        wherein the memory further stores a layout for a logic circuit,
        wherein the layout comprises multiple cells selected from the cell library to represent the logic circuit, and
        wherein the memory further stores timing constraints for the logic circuit; and
    a processor in communication with the memory and generating an updated layout by replacing a cell of the multiple cells in the layout with a replacement cell from a same set of cells in the cell library, wherein the replacement cell has a different combination of the cell boundary isolation structures than the cell to facilitate fixing of a violation of a timing constraint.

2. The system of claim 1, wherein the replacing of the cell adds delay to any one of a data signal and a clock signal and avoids a concurrent increase in power consumption and at least limits a concurrent increase in area consumption.

3. The system of claim 1, wherein the at least three different types of possible cell boundary isolation structures include:
    a first cell boundary isolation structure comprising: a gate overlaying an edge portion of an active semiconductor region, wherein the gate of the first cell boundary isolation structure and an adjacent inner portion of the active semiconductor region are electrically coupled;
    a second cell boundary isolation structure comprising: a gate overlaying an edge portion of an active semiconductor region, wherein the gate of the second cell boundary isolation structure and an adjacent inner portion of the active semiconductor region are not electrically coupled; and
    a third cell boundary isolation structure comprising: a gate overlaying an isolation region that abuts an edge portion of an active semiconductor region.

4. The system of claim 3, wherein the third cell boundary isolation structure causes higher signal delay than the second cell boundary isolation structure and the second cell boundary isolation structure causes higher signal delay than the first cell boundary isolation structure.

5. The system of claim 3, wherein, in the updated layout, gates of adjacent second cell boundary isolation structures of adjacent cells are separated by an isolation filler cell.

6. The system of claim 1, wherein the logic circuit comprises:
    a first flip-flop having a first data input, a first clock input, and a first data output;
    a second flip-flop having a second data input, a second clock input, and a second data output; and
    logic elements connected between the first data output and the second data input.

7. The system of claim 6,
    wherein the timing constraints comprise a hold time constraint for the second flip-flop,
    wherein the layout exhibits a violation of the hold time constraint, and
    wherein the violation of the hold time constraint is fixed in the updated layout by using cell replacement to add delay to a data signal within the logic elements.

8. The system of claim 7, wherein the violation of the hold time constraint is fixed in the updated layout by using cell replacement to add delay to any of a clock signal at the first clock input and to a data signal at the first data output.

9. The system of claim 6,
    wherein the timing constraints comprise a setup time constraint for the second flip-flop, wherein the layout exhibits a violation of the setup time constraint, and
    wherein the violation of the setup time constraint is fixed in the updated layout by using cell replacement to add delay to a clock signal at the second clock input.

10. A method comprising:
    accessing, by a processor from memory, a cell library, a layout for a logic circuit, and timing constraints for the logic circuit,
        wherein the cell library comprises sets of cells with all cells in a set of cells having different combinations of cell boundary isolation structures associated with different delay values, and with each cell in each set having opposite ends and, at the opposite ends, two cell boundary isolation structures of at least three different types of possible cell boundary isolation structures,
        wherein the layout comprises multiple cells selected from the cell library to represent the logic circuit; and
    generating, by the processor, an updated layout by replacing a cell of the multiple cells in the layout with a replacement cell from a same set of cells in the cell library, wherein the replacement cell has a different combination of the cell boundary isolation structures than the cell to facilitate fixing of a violation of a timing constraint.

11. The method of claim 10, wherein the replacing of the cell adds delay to any one of a data signal and a clock signal and avoids a concurrent increase in power consumption and at least limits a concurrent increase in area consumption.

12. The method of claim 10, wherein the at least three different types of possible cell boundary isolation structures include:
   a first cell boundary isolation structure comprising: a gate overlaying an edge portion of an active semiconductor region, wherein the gate of the first cell boundary isolation structure and an adjacent inner portion of the active semiconductor region are electrically coupled;
   a second cell boundary isolation structure comprising: a gate overlaying an edge portion of an active semiconductor region, wherein the gate of the second cell boundary isolation structure and an adjacent inner portion of the active semiconductor region are not electrically coupled; and
   a third cell boundary isolation structure comprising: a gate overlaying an isolation region that abuts an edge portion of an active semiconductor region.

13. The method of claim 12, wherein the third cell boundary isolation structure causes higher signal delay than the second cell boundary isolation structure and the second cell boundary isolation structure causes higher signal delay than the first cell boundary isolation structure.

14. The method of claim 12, wherein, in the updated layout, gates of adjacent second cell boundary isolation structures of adjacent cells are separated by an isolation filler cell.

15. The method of claim 10, wherein the logic circuit comprises:
   a first flip-flop having a first data input, a first clock input, and a first data output;
   a second flip-flop having a second data input, a second clock input, and a second data output; and
   logic elements connected between the first data output and the second data input.

16. The method of claim 15,
   wherein the timing constraints comprise a hold time constraint for the second flip-flop, wherein the layout exhibits a violation of the hold time constraint, and
   wherein the violation of the hold time constraint is fixed in the updated layout by using cell replacement to add delay to a data signal within the logic elements.

17. The method of claim 16, wherein the violation of the hold time constraint is fixed in the updated layout by using cell replacement to add delay to any of a clock signal at the first clock input and a data signal at the first data output.

18. The method of claim 15,
   wherein the timing constraints comprise a setup time constraint for the second flip-flop, wherein the layout exhibits a violation of the setup time constraint, and
   wherein the violation of the setup time constraint is fixed in the updated layout by using cell replacement to add delay to a clock signal at the second clock input.

19. A computer program product comprising a non-transitory computer readable storage medium having program instructions embodied therewith, wherein the program instructions are executable by a processor to cause the processor to perform a method and wherein the method comprises:
   accessing, from a memory, a cell library, a layout for a logic circuit, and timing constraints for the logic circuit,
      wherein the cell library comprises sets of cells with all cells in a set of cells having different combinations of cell boundary isolation structures associated with different delay values, and with each cell in each set having opposite ends and, at the opposite ends, two cell boundary isolation structures of at least three different types of possible cell boundary isolation structures,
      wherein the layout comprises multiple cells selected from the cell library to represent the logic circuit; and
   generating an updated layout by replacing a cell of the multiple cells in the layout with a replacement cell from a same set of cells in the cell library, wherein the replacement cell has a different combination of the cell boundary isolation structures than the cell to facilitate fixing a violation of a timing constraint.

20. The computer program product of claim 19, wherein the replacing of the cell adds delay to any one of a data signal and a clock signal and avoids a concurrent increase in power consumption and at least limits a concurrent increase in area consumption.

* * * * *